United States Patent
Batni et al.

(10) Patent No.: US 8,175,252 B2
(45) Date of Patent: May 8, 2012

(54) RINGBACK TONE BOOKMARK REQUEST BY CALLING PARTY

(75) Inventors: Ramachendra P. Batni, Phoenix, AZ (US); Ranjan Sharma, New Albany, OH (US)

(73) Assignee: Alcatel Lucent, Paris (FR)

( * ) Notice: Subject to any disclaimer, the term of this patent is extended or adjusted under 35 U.S.C. 154(b) by 1097 days.

(21) Appl. No.: 11/168,629

(22) Filed: Jun. 28, 2005

(65) Prior Publication Data

US 2007/0003047 A1    Jan. 4, 2007

(51) Int. Cl.
*H04M 3/00* (2006.01)

(52) U.S. Cl. ............... 379/257; 379/201.01; 379/207.16; 379/911; 455/401

(58) Field of Classification Search ............. 379/202.01, 379/207.16, 257, 201.01, 114.13, 911
See application file for complete search history.

(56) References Cited

U.S. PATENT DOCUMENTS

| | | | |
|---|---|---|---|
| 7,010,112 B2 * | 3/2006 | Lee et al. | 379/207.16 |
| 7,336,777 B2 * | 2/2008 | Lee et al. | 379/207.08 |
| 2004/0120494 A1 * | 6/2004 | Jiang et al. | 379/210.01 |
| 2007/0123311 A1 * | 5/2007 | Kim et al. | 455/567 |

* cited by examiner

*Primary Examiner* — Antim Shah
(74) *Attorney, Agent, or Firm* — Carmen Patti Law Group, LLC

(57) ABSTRACT

A ringback tone is played to a calling party on a call to a called party. Identification information of the ringback tone is stored, upon receipt of a bookmark request from the calling party, for later access by the calling party to the ringback tone and/or information related to the ringback tone.

22 Claims, 3 Drawing Sheets

US 8,175,252 B2

RINGBACK TONE BOOKMARK REQUEST BY CALLING PARTY

CROSS-REFERENCE TO RELATED APPLICATIONS

This application contains subject matter that is related to the subject matter of the following applications, which are assigned to the same assignee as this application. The below-listed applications are hereby incorporated herein by reference in their entireties:

"FEEDBACK TO CALLING COMMUNICATION DEVICE ON CALL CONNECTED WITH INTELLIGENT NETWORK SIGNALING," by Ramachendra P. Batni, Robert Brunetti, John B. Reid, Laura Scruggs Reizner, and Michael Joseph Rudolph, application Ser. No. 10/683,969, filed Oct. 10, 2003.

"CHANGE TO PLAYBACK CHARACTERISTIC OF RINGBACK TONE," by Ramachendra P. Batni and Ranjan Sharma, application Ser. No. 11/045,706, filed Jan. 28, 2005.

"RINGBACK TONE SERVICE OPT-IN AND OPT-OUT REQUESTS FOR USE BY CALLING PARTY," by Ramachendra P. Batni and Ranjan Sharma, co-filed herewith.

TECHNICAL FIELD

The invention relates generally to communications and more particularly to ringback tone service.

BACKGROUND

Known ringback tone services allow a called party to preselect a ringback tone to be played to a calling party. Traditionally, the calling party would hear a standard ringback sound before the called party answers the call. The ringback tone service replaces that standard ringback sound with a ringback tone selected by the called party. For example, the ringback tone service allows the called party to customize the ringback sound that the calling party hears during the ringing phase of a call to the called party. The calling party hears the ringback tone preselected by the called party while waiting for the called party to answer.

After hearing the ringback tone on the call, the calling party may like the ringback tone. However, the calling party may not recognize the ringback tone. Therefore, the calling party may want to learn the identification details of the ringback tone. For example, where the ringback tone is a song, the calling party may want to know the name of the song and/or the name of the artist. Also, where the calling party is a ringback tone service subscriber, the subscriber may want to learn the identification details so that the subscriber can purchase the ringback tone and in turn subsequently provide the same ringback tone to other callers that call the subscriber.

If the calling party does not recognize the ringback tone, then the called party may attempt to learn the identification details by contacting the called party to ask about the ringback tone. As one shortcoming, asking the called party about the ringback tone may be inconvenient for both the calling party and the called party. As another shortcoming, the called party may not know or remember the identification details for the ringback tone that was played on the call. For example, the ringback tone service may have randomly selected the ringback tone from a jukebox for the call. As another example, several short segments of the same song may exist as available ringback tones and the subscriber may not be able to identify which segment was played on the call.

Thus, a need exists for a ringback tone service with an increased availability of identification information of the ringback tones that are played to calling parties.

SUMMARY

A ringback tone service allows customization of the ringback sound that a calling party hears during a ringing phase of a call to a called party. The ringback tone service replaces the standard ringback sound that a calling party normally hears with a ringback tone selected by the called party. After hearing the ringback tone on the call, the calling party may like the ringback tone and want to learn the identification information of the ringback tone. If the calling party has an interest in the ringback tone and wants to be reminded of the ringback tone at a later time, the calling party can make a bookmark request to the ringback tone service. The bookmark request indicates to the ringback tone service to store the identification information of the ringback tone for later access by the calling party to the ringback tone and/or information related to the ringback tone.

In one embodiment, there is provided a method for: playing a ringback tone to a calling party on a call to a called party; and storing identification information of the ringback tone, upon receipt of a bookmark request from the calling party, for later access by the calling party to the ringback tone and/or information related to the ringback tone.

In another embodiment, there is provided an apparatus comprising a ringback tone server that plays a ringback tone to a calling party and receives a bookmark request from the calling party. Upon receipt of the bookmark request, the ringback tone server stores identification information of the ringback tone for later access by the calling party to the ringback tone and/or information related to the ringback tone.

In yet another embodiment, there is provided an article comprising one or more computer-readable signal-bearing media. The article comprises means in the one or more media for playing a ringback tone to a calling party on a call to a called party. The article also comprises means in the one or more media for storing identification information of the ringback tone, upon receipt of a bookmark request from the calling party, for later access by the calling party to the ringback tone and/or information related to the ringback tone.

DESCRIPTION OF THE DRAWINGS

Features of exemplary implementations of the invention will become apparent from the description, the claims, and the accompanying drawings in which:

DETAILED DESCRIPTION

Figure 1:
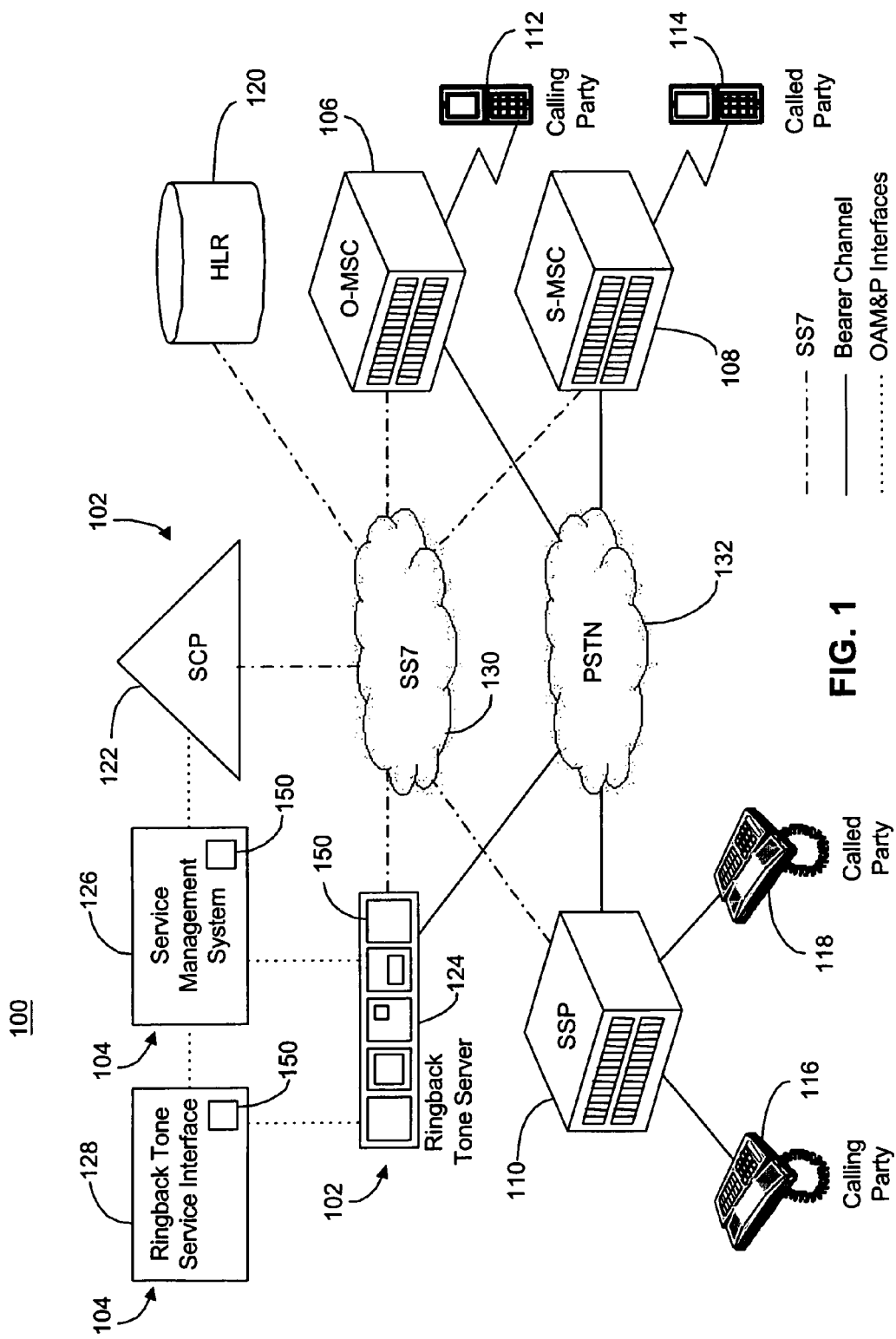
FIG. 1 is a representation of one implementation of an apparatus that comprises one or more intelligent network platforms, one or more account management components, one or more mobile switching centers, and one or more service switching points.

Turning to FIG. 1, an apparatus 100 provides a ringback tone service for wireless and/or wire-line telecommunication systems. The ringback tone service in one example replaces the standard ringback sound that a calling party normally hears with a ringback tone selected by a called party. After hearing the ringback tone on the call, the calling party may like the ringback tone and want to learn the identification information of the ringback tone. If the calling party has an interest in the ringback tone and wants to be reminded of the ringback tone at a later time, the calling party can make a bookmark request to the ringback tone service. The bookmark request indicates to the ringback tone service to store the identification information of the ringback tone for later access by the calling party to the ringback tone and/or information related to the ringback tone.

The apparatus 100 in one embodiment comprises one or more intelligent network ("IN") platforms 102, one or more account management components 104, one or more mobile switching centers ("MSCs") 106 and 108, and one or more service switching points ("SSPs") 110. The MSCs 106 and 108 in one example support wireless communication devices, such as a calling party 112 and a called party 114. The SSP 110 in one example supports wire-line communication devices, such as a calling party 116 and a called party 118. In one example, the apparatus 100 further comprises a home location register ("HLR") 120 associated with the called party 114.

The intelligent network platforms 102 in one example comprise a service control point ("SCP") 122 and a ringback tone server 124. The SCP 122 serves as the ringback tone call controller for the ringback tone service provided by the ringback tone server 124. The account management components 104 in one example comprise a service management system 126 and a ringback tone service interface 128.

A signaling network 130 communicatively couples the SCP 122, the ringback tone server 124, the MSCs 106 and 108, the SSP 110, and the home location register 120. The signaling network 122 in one example comprises a signaling system 7 ("SS7") network that supports signaling traffic. A bearer network 132 communicatively couples the ringback tone server 124, the MSCs 106 and 108, and the SSP 110. The bearer network 124 in one example comprises a public switched telephone network ("PSTN") that supports bearer traffic.

The SCP 122 and the ringback tone server 124 comprise telephony network platforms. The SCP 122 and the ringback tone server 124 in one example support intelligent network technology and standards. In one example, the SCP 122 and the ringback tone server 124 operate in a wireless intelligent network ("WIN"). In one example, the SCP 122 and the ringback tone server 124 operate under Customized Applications for Mobile network Enhanced Logic ("CAMEL"). The ringback tone server 124 comprises an instance of a recordable data storage medium 150, as described herein.

The SCP 122 and the ringback tone server 124 may be combined into a single intelligent network platform or divided into a plurality of intelligent network platforms. The SCP 122 and the ringback tone server 124 serve to route calls and play ringback tones to the calling party (e.g., the calling party 112 or 116) on calls from the calling party to the called party (e.g., the called party 114 or 118). For example, the SCP 122 and the ringback tone server 124 serve to enable a ringback tone service. The SCP 122 and the ringback tone server 124 allow the called party (e.g., the called party 114 or 118) to preselect a ringback tone that will be played to the calling party (e.g., the calling party 112 or 116).

In one example, the SCP 122 comprises service logic, American National Standards Institute ("ANSI-41") message handling logic, WIN message handling logic, and an SS7 interface. In another example, the SCP 122 comprises service logic, Global System for Mobile communications ("GSM") message handling logic, and Customized Applications for Mobile network Enhanced Logic message handling logic, and the SS7 interface. The SCP 122 in one example comprises a call controller and a data server. In one example, the call controller and the data server reside on a single SCP. In another example, the call controller and the data server reside on different SCPs. If the call controller and the data server reside on different SCPs, then the call controller queries the data server on the separate SCP for subscriber profile information and to determine what ringback tone to play at the calling party 112 or 116. The SCP 122 in one example provides instruction to the ringback tone server 124 to control the functionality of the ringback tone server 124. For example, the SCP 122 sends messages to the ringback tone server 124 to instruct the ringback tone server 124 to play the ringback tone to the calling party 112 or 116.

The SCP 122 in one example employs one or more of WIN signaling, CAMEL signaling, ANSI advanced intelligent network ("AIN") signaling, session initiation protocol ("SIP") signaling, and International Telecommunication Union ("ITU-T") Capability Set ("CS") signaling, such as ITU-T CS-1 signaling, to route calls that require the ringback tone service to the ringback tone server 124. An exemplary employment of WIN signaling is illustrated herein. For example, the SCP 122 receives WIN signaling relating to an incoming call at the MSC 106 for the called party 114. If the incoming call does not require ringback tone service, then the SCP 122 instructs the MSC 106 to provide a standard ringing sound to the calling party 112. If the incoming call requires ringback tone service, then the SCP 122 sets parameters in WIN signaling messages to direct the incoming call to the ringback tone server 124. Therefore, the ringback tone server 124 can play the specialized ringback tone to the calling party 112. For example, the SCP 122 routes the incoming call to the ringback tone server 124, so the ringback tone server 124 may play the specialized ringback tone at the calling party 112 prior to connection of the call with the called party 114. In one example, the ringback tone server 124 stores the available ringback tones. In another example, the ringback tone server 124 accesses a storage component that stores the available ringback tones. The storage component can be part of the ringback tone server 124 or external to the ringback tone server 124.

To route the incoming call to the ringback tone server 124, the SCP 122 in one example sets a TerminationList parameter of a WIN signaling message to a directory number of the ringback tone server 124. Then, the SCP 122 sends the TerminationList parameter in the WIN signaling message to the MSC 106 that queried the SCP 122 on what action to take for the incoming call. Upon receipt of the WIN signaling message, the MSC 106 connects the call to the ringback tone server 124.

The SCP 122 and the ringback tone server 124 in one example employ WIN signaling, Integrated Services Digital Network User Part ("ISUP") signaling, and ANSI signaling to enable the ringback tone service. The WIN signaling, ISUP signaling, and ANSI signaling are in accordance with ANSI standards. In one exemplary implementation, the signaling messages follow one or more of ANSI/TIA/EIA-41-D, TIA/EIA/IS-771, and TIA/EIA/IS-826 standards, in addition to ANSI ISUP standards for the bearer connection.

The ringback tone server 124 is connected to the one or more account management components 104 through operations, administration, maintenance, and provisioning ("OAM&P") interfaces, such as a Transmission Control Protocol/Internet Protocol ("TCP/IP") connection. The account management components 104 interact with ringback tone service subscribers to provide the subscribers with one or more options related to ringback tones that the subscribers have previously bookmarked, as described herein. For example, the account management components 104 may store information that supports a web interface to the subscribers. The account management components 104 in one example comprise the service management system 126 and the ringback tone service interface 128. The ringback tone system may employ the service management system 126 or the ringback tone service interface 128 to interface with the ringback tone service subscribers. The service management system 126 and the ringback tone service interface 128 comprise an instance of a recordable data storage medium 150, as described herein.

The service management system 126 comprises a provisioning system. The service management system 126 in one example handles subscriber provisioning, subscriber profile updating, interfacing to content providers, ringback tone distribution to ringback tone servers, and the like. The service management system 126 in one example is connected with the ringback tone service interface 128. The ringback tone service interface 128 in one example provides Wireless Application Protocol ("WAP") provisioning, Interactive Voice Response ("IVR") provisioning, service management system provisioning, subscriber web portals, CRM web portals, call center web portals, interfaces to billing systems, and the like.

In one example, the subscriber of the ringback tone service comprises a wireless communication device, such as the called party 114. The called party 114 may select specialized ringback tones for the ringback tone service to play to wireless and wire-line communication devices (e.g., the calling party 112 and the calling party 116) that call the called party 114. Upon receipt of an incoming call for the called party 114 at the MSC 106, the SCP 126 receives signaling relating to the incoming call from the MSC 106. The MSCs 106 and 108 support mobile telecommunication devices, for example, the calling party 112 and the called party 114. The MSCs 106 and 108 in one example comprise an originating mobile switching center ("O-MSC") 106 for the called party 114 and a serving mobile switching center ("S-MSC") 108 for the called party 114. For example, the O-MSC 106 supports a home area of the called party 114 and the S-MSC 108 supports the called party 114 if the called party 114 moves to a roaming area. If the called party 114 is within the home area supported by the O-MSC 106, then the S-MSC 108 may not be in the call path between the calling party 112 and the called party 114. For example, the O-MSC 106 would also serve as a S-MSC for the called party 114. The calling party 112 in one example is supported by the O-MSC of the called party 114 (as shown in FIG. 1). The calling party 112 in another example is supported by a different MSC (not shown) and a call from the calling party 112 to the called party 114 will pass from the calling party 112 to the other MSC, then through the bearer network 132, and to the O-MSC 106 of the called party 114 to locate the called party 114 for the call.

In another example, the subscriber of the ringback tone service comprises a wire-line communication device, such as the called party 118. The called party 118 may select specialized ringback tones for the ringback tone service to play to wireless and wire-line communication devices (e.g., the calling party 112 and the calling party 116) that call the called party 114. Upon receipt of an incoming call for the called party 118 at the SSP 110, the SCP 126 receives signaling relating to the incoming call from the SSP 110. The SSP 110 supports wire-line telecommunication devices, for example, the calling party 116 and the called party 118. The SSP 110 is the service switching point for the called party 118. The calling party 116 in one example is supported by the SSP of the called party 118 (as shown in FIG. 1). The calling party 116 in another example is supported by a different SSP (not shown) and a call from the calling party 116 to the called party 118 will pass from the calling party 116 to the other SSP, then through the bearer network 132, and to the SSP 110 of the called party 118.

Figure 2:
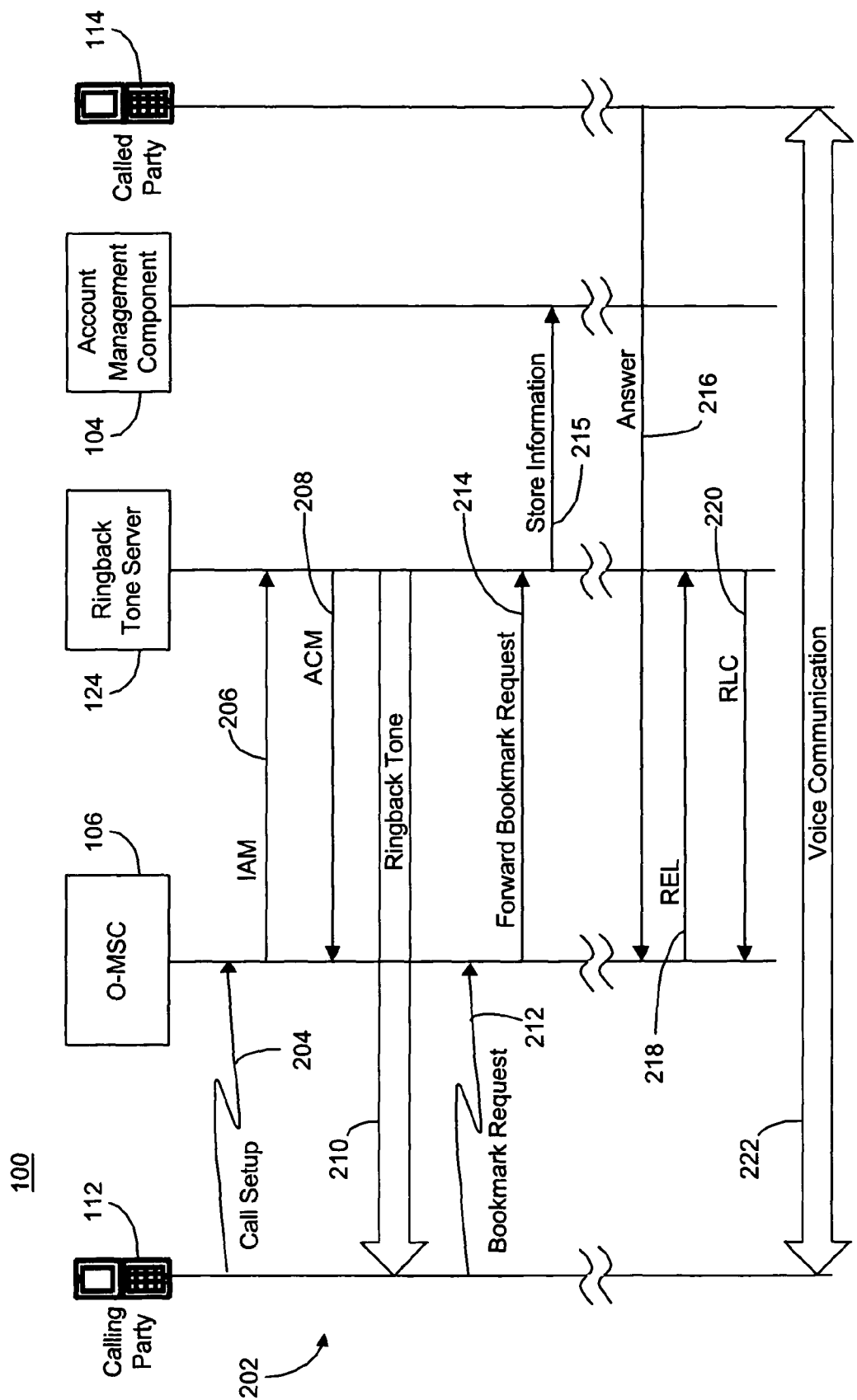
FIG. 2 is a representation of one exemplary message flow that illustrates an exemplary bookmark request by a calling party on a call to a called party that selected the ringback tone that is played to the calling party on the call.

Referring to FIGS. 1-2, an illustrative description of one exemplary operation of the apparatus 100 is presented, for explanatory purposes. A message flow 202 represents an exemplary bookmark request by the calling party (e.g., the calling party 112 or the calling party 116) on a call to the called party (e.g., the called party 114 or the called party 118). An exemplary implementation is described herein using the wireless communication devices (e.g., the calling party 112 and the called party 114). In another example, the calling party and the called party comprise wire-line communication devices (e.g., the calling party 116 and the called party 118). A message flow for the wire-line communication devices would be analogous to the message flow 202, as will be appreciated by those skilled in the art. In yet another example, the calling party comprises a wire-line communication device (e.g., the calling party 116) and the called party comprises a wireless communication device (e.g., the called party 114). A message flow for the call from the wire-line communication device to the wireless communication device would be analogous to the message flow 202, as will be appreciated by those skilled in the art. In still another example, the calling party comprises a wireless communication device (e.g., the calling party 112) and the called party comprises a wire-line communication device (e.g., the called party 118). A message flow for the call from the wireless communication device to the wire-line communication device would be analogous to the message flow 202, as will be appreciated by those skilled in the art.

To initiate a call to the called party 114, the calling party 112 dials the telephone number of the called party 114 resulting in a call setup message 204 being received at the O-MSC 106. In response to the call setup message 204, the O-MSC 106 contacts the HLR 120 of the called party 114 and determines that a specialized ringback tone will be played to the calling party 112 on the call. Therefore, the O-MSC 106 sends an ISUP initial address message 206 to the ringback tone server 124. The calling party number parameter of the initial address message 206 is set to the directory number of the calling party 112. The redirecting number parameter of the initial address message 206 is set to the directory number of the called party 114. The called party number parameter of the initial address message 206 is set to the routing digits that are used to route the call to the ringback tone server 124.

Upon receipt of the initial address message 206, the ringback tone server 124 invokes ringback tone determination logic. For example, the ringback tone server 124 determines which ringback tone is to be played to the calling party 112 on the call. In one example, the ringback tone determination logic is located on the ringback tone server 124. In another example, the ringback tone determination logic is located on separate platform, such as the SCP 122. To determine which ringback tone to play to the calling party 112 on the call, the SCP 122 would access a ringback tone subscriber profile of the called party 114. The ringback tone subscriber profile stores the ringback tone selection criteria set by the called party 114. The SCP 122 compares characteristics of the call to the ringback tone selection criteria to determine which ringback tone to play to the calling party 112. The SCP 122 then sends an identification of the ringback tone to the ringback tone server 124 to instruct the ringback tone server 124 to play the ringback tone to the calling party 112. In response to the initial address message 206, the ringback tone server 124 sends an acknowledgement message 208 to the O-MSC 106. The acknowledgement message 208 in one example comprises an ISUP address complete message. The acknowledgement message 208 invokes voice path cut-thru to the calling party 112.

After sending the acknowledgement message 208, the ringback tone server 124 plays a ringback tone 210 to the calling party during a ringing phase of the call from the calling party 112 to the called party 114. The ringback tone 210 in one example comprises a specialized ringback tone selected by the called party 114 for use on the call. The ringback tone server 124 in one example provides control instructions to the calling party 112 on the call prior to playing the ringback tone. The control instructions indicate how the calling party 112 can interact with the ringback tone service. For example, the ringback tone server 124 may announce to the calling party 112 that the calling party 112 can press "7", say "bookmark", or send a specific data message to make a bookmark request for the ringback tone 210. The ringback tone server 124 also initializes the bearer channel port for the call to listen for any keypad entry or voice command by the calling party 112. For example, the ringback tone server 124 may employ a listening device to detect Dual-Tone Multi-Frequency ("DTMF") inputs or voice commands.

After hearing the ringback tone on the call, the calling party 112 may like the ringback tone and want to learn the identification information of the ringback tone 210. If the calling party 112 has an interest in the ringback tone 210 and wants to be reminded of the ringback tone 210 at a later time, the calling party 112 makes a bookmark request 212 to the ringback tone service. The bookmark request 212 indicates to the ringback tone service to store the identification information of the ringback tone 210 for later access by the calling party 112 to the ringback tone 210 or information related to the ringback tone 210. The bookmark request 212 in one example indicates the intention of the calling party 112 to possibly purchase the ringback tone 210 in the future. The O-MSC 106 receives the bookmark request 212 and forwards an indication 214 of the bookmark request 212 over the bearer channel to the ringback tone server 124.

The bookmark request 212 may comprise a DTMF tone, a voice command, or data message input by the calling party 112. The voice command "bookmark", the DTMF tone "7", and the data message "bookmark" in one example correspond to the bookmark request 212. For example, if the listening device receives the voice command "bookmark" or the DTMF tone "7" during the ringing phase of the call, then the ringback tone server 124 determines that the calling party 112 has made a bookmark request. The ringback tone server 124 in one example ignores additional bookmark requests on the call after the bookmark request 212. For example, if the calling party 112 presses "7" multiple times on the same call, only one entry is created for the bookmark request 212 of the ringback tone 210.

In another example, if the ringback tone server 124 receives a TCP/IP or SIP "bookmark" message during the ringing phase of the call, then the ringback tone server 124 determines that the calling party 112 has made a bookmark request. For example, the address of the ringback tone server 124 can be downloaded to calling communication device so that the user can hit a softkey on the communication device while hearing the ringback tone 210 to cause a data message to be sent to the ringback tone server 124 to make the bookmark request 212.

Upon receipt of the indication 214 of the bookmark request 212, the ringback tone server 124 invokes the ringback tone service bookmarking feature. The ringback tone server 124 captures the bookmark information, such as the bookmark request 212 and the associated data. Examples of the associated data captured by the ringback tone server 124 for storage comprise: the identification information of the ringback tone 210, an identification of the calling party 112, an identification of the called party 114, a date of the call, a time of the call, and an identification of a ringback tone server 124 that played the ringback tone 210 to the calling party 112.

The ringback tone service bookmarking feature stores the bookmark information in one of the account management components 104. The account management component 104 associates the bookmark information with a ringback tone service account of the calling party 112 for later presentation of the bookmark information to the calling party 112. In one example, the ringback tone service bookmarking feature stores the bookmark information in the service management system 126. In another example, the ringback tone service bookmarking feature stores the bookmark information in the ringback tone service interface 128.

Where the bookmark information is stored in the service management system 126, the ringback tone server 124 captures the bookmark information in a real-time database. The real-time database is set up so that any changes in the real-time database are conveyed to the service management system 126 over an OAM&P message interface between the ringback tone server 124 and the service management system 126. For example, the real-time database in the ringback tone server 124 sends the bookmark information in an information storage message 215 over a TCP/IP interface to the service management system 126. The service management system 126 receives the information storage message 215 and checks a ringback tone subscriber database to determine if the calling party 112 is a ringback tone service subscriber. If the calling party 112 is not a ringback tone service subscriber, the service management system 126 discards the information storage message 215 and no further action is taken on the bookmark request 212. If the calling party 112 is a ringback tone service subscriber, the service management system 126 saves the bookmark information received in the information storage message 215 in a bookmark message database maintained in the service management system 126.

Where the bookmark information is stored in the ringback tone service interface 128, the ringback tone server 124 sends the bookmark information in a text message over an OAM&P interface to the ringback tone service interface 128. For example, the ringback tone server 124 sends an information storage message 215 that carries the bookmark information over a TCP/IP interface to the ringback tone service interface 128. The ringback tone server 124 in one example sends the bookmark information directly to the ringback tone service interface 128 without use of a real-time database for temporary storage between the ringback tone server 124 and the ringback tone service interface 128. The ringback tone service interface 128 receives the information storage message 215 and checks a ringback tone subscriber database to determine if the calling party 112 is a ringback tone service subscriber. If the calling party 112 is not a ringback tone service subscriber, the ringback tone service interface 128 discards the information storage message 215 and no further action is taken on the bookmark request 212. If the calling party 112 is a ringback tone service subscriber, the ringback tone service interface 128 saves the bookmark information received in the information storage message 215 in a bookmark message database maintained in the ringback tone service interface 128.

The called party 114 in one example answers the call after the calling party 112 inputs the bookmark request 212 resulting in an answer message 216 being received at the O-MSC 106. Upon receipt of the answer message 216, the O-MSC 106 connects the calling party 112 with the called party 114 and sends a release message 218 to the ringback tone server 124. Upon receipt of the release message 218, the ringback tone server 124 releases the internal resources allocated to the call and sends a release complete message 220 to the O-MSC 106. Upon receipt of the release complete message 220, the O-MSC 106 releases the bearer path to the ringback tone server 124. Once the O-MSC 106 connects bearer paths between the calling party 112 and the called party 114, voice communication 222 ensues between the calling party 112 and the called party 114.

Figure 3:
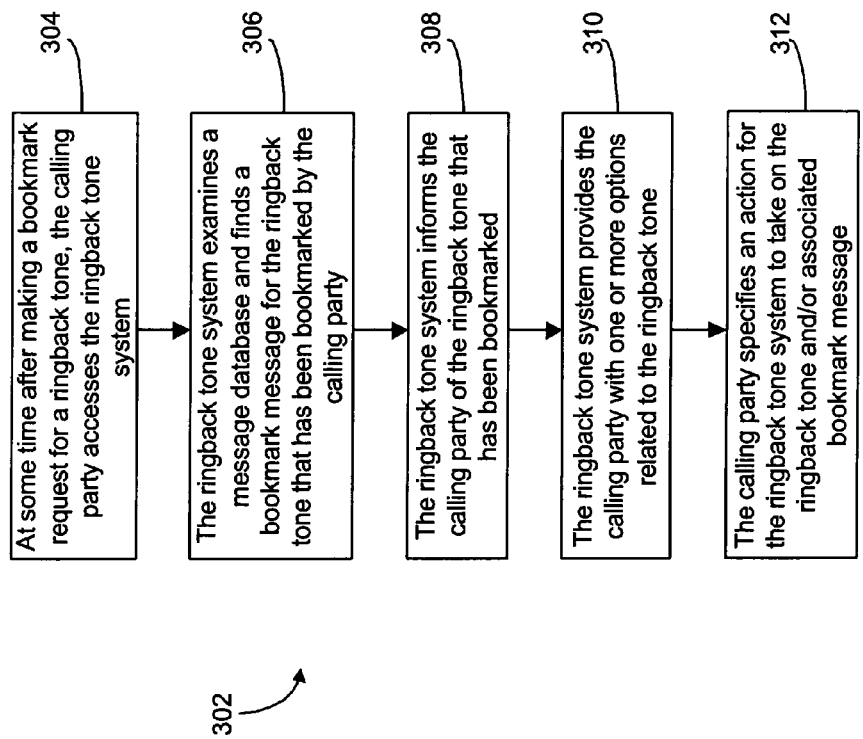
FIG. 3 is a representation of one exemplary logic flow that illustrates one of the account management components of the apparatus of FIG. 1 informing the calling party of the ringback tone that was bookmarked in the message flow of FIG. 2.

Referring to FIGS. 1-3, an illustrative description of another exemplary operation of the apparatus 100 is presented, for explanatory purposes. Exemplary logic 302 serves to illustrate one of the account management components 104 informing the calling party (e.g., the calling party 112 or the calling party 116) of the ringback tone 210 that has been bookmarked. For example, one of the account management components 104 informs the calling party of the ringback tone 210 that was bookmarked in the message flow 202. The calling party comprises a subscriber of the ringback tone service. The logic 302 employs one or more steps, for example, STEPS 304, 306, 308, 310, and 312.

At STEP 304, at some time after making the bookmark request 212 for the ringback tone 210, the subscriber (i.e., the calling party 112) accesses the ringback tone system. For example, the subscriber logs into one of the account management components 104 to access the ringback tone service account of the subscriber. The subscriber may access the account management components 104 through a service interface, such as a web interface or an interactive voice response system.

In one example, the service management component 126 maintains the ringback tone service account of the subscriber. The subscriber logs into the service management component 126 to make changes to the ringback tone service. In another example, the ringback tone service interface 128 maintains the ringback tone service account of the subscriber. The subscriber logs into the ringback tone service interface 128 to make changes to the ringback tone service. Once the subscriber logs into the account management component 104 that provides the ringback tone bookmark feature, then STEP 304 proceeds to STEP 306.

At STEP 306, the account management component 104 examines a bookmark message database to determine whether the subscriber has bookmarked any ringback tones. Because the subscriber made the bookmark request 212 for the ringback tone 210 in the message flow 202, the account management component 104 will find a bookmark message for the ringback tone 210 in the bookmark message database. Once the account management component 104 locates the bookmark message for the ringback tone 210, then STEP 306 proceeds to STEP 308.

At STEP 308, the account management component 104 informs the subscriber of the ringback tone 210 that has been bookmarked. For example, the account management component 104 presents the identification information of the ringback tone 210 to the subscriber to remind the subscriber of the ringback tone 210. For example, the account management component 104 may present the identification information of the ringback tone 210, an identification of the called party 114 of the call, a date of the call, a time of the call, and the like. Where the ringback tone 210 comprises a song, the account management component 104 may present to the subscriber the artist of the song, the name of the song, the name of the album that contains the song, and the like. In another example, the account management component 104 may provide additional details to the subscriber, such as where the album containing the song can be purchased. Furthermore, the account management component 104 may present information to the subscriber on how a discount can be obtained if the album is purchased at certain preferred vendors within a specified time period. Once the account management component 104 informs the calling party 112 of the ringback tone 210, then STEP 308 proceeds to STEP 310.

At STEP 310, the account management component 104 provides the subscriber with one or more options related to the ringback tone 210. In a first option, the subscriber can request the account management component 104 to replay the ringback tone 210 so the subscriber can hear the entire ringback tone. In a second option, the subscriber can query the account management component 104 for other details of the ringback tone 104, such as the purchase price of the ringback tone 210, the artist of the ringback tone 210, the name of the ringback tone 210, the name of the album that contains the ringback tone 210, a location where the song associated with the ringback tone 210 can be purchased, and the like. In a third option, the subscriber can choose to purchase the ringback tone 210 for subsequent use as the ringback tone played to other callers that make incoming calls to the subscriber. In a fourth option, the subscriber can choose to instruct the account management component 104 to discard the bookmark message associated with the ringback tone 210 from the bookmark request database if the subscriber indicates that a subsequent reminder of the ringback tone 210 is not desired. In a fifth option, the subscriber can choose to instruct the account management component 104 to keep the bookmark message associated with the ringback tone 210 in the bookmark request database if the subscriber indicates that a subsequent reminder of the ringback tone 210 is desired. In a sixth option, the subscriber can indicate to the account management component 104 that the subscriber wants to buy the album that contains the song represented in the ringback tone. 210. In a seventh option, the subscriber could query for a purchase price of the album that contains the song represented in the ringback tone 210. In an eight option, the subscriber could print a sale or discount coupon for the album provided by the account management component 104. For example, as an inducement to the subscriber to purchase the ringback tone 210, the account management component 104 may give the subscriber a discount coupon for the amount of the purchase. Since the subscriber may be accessing the account management component 104 via the web thru a computer with a printer, they can print out the coupon, take it to a record store and purchase the full album. The account management component 104 may also provide other analogous options to the subscriber. Once the account management component 104 provides the calling party 112 with the one or more available options related to the ringback tone 210, then STEP 310 proceeds to STEP 312.

At STEP 312, the subscriber specifies an action for the account management component 104 to take on the ringback tone 210 and/or the associated bookmark message. In one example, the subscriber exercises the option to purchase the ringback tone 210 for subsequent use. The account management component 104 will initiate the purchase process and initiate the addition of the ringback tone to the pool of available ringback tones for the subscriber. For example, if the subscriber decides to purchase the ringback tone 210, then a ringback tone subscriber profile of the ringback tone service account is updated to add an indication of the ringback tone 210. The subscriber can work with the ringback tone service to indicate which calls or callers should hear the ringback tone 210 on calls to the subscriber. For example, based on input from the subscriber, the ringback tone service will create one or more ringback tone selection criteria that indicate when to play the ringback tone 210 associated with the bookmark request to other callers on the incoming calls to the subscriber. The ringback tone selection criteria are stored in the ringback tone subscriber profile.

In another example, the subscriber decides that a subsequent reminder of the ringback tone 210 is not desired. Therefore, the account management component 104 removes the bookmark message associated with the ringback tone 210 from the bookmark request database. In yet another example, the subscriber decides that a subsequent reminder of the ringback tone 210 is desired. Therefore, the account management component 104 keeps the bookmark message associated with the ringback tone 210 in the bookmark request database for use in the subsequent reminder to the subscriber.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable signal-bearing media. The computer-readable signal-bearing media store firmware and/or hardware for performing one or more portions of one or more embodiments of the invention. Examples of a computer-readable signal-bearing medium for the apparatus 100 comprise the recordable data storage medium 150 of the ringback tone server 124, the service management system 126, and the ringback tone service interface 128. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a network which transmits modulated carrier signals comprising or coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising the steps of:
    playing a ringback tone to a calling party on a call to a called party;
    storing identification information of the ringback tone by a ringback tone server that resides in a Wireless Intelligent Network, wherein the ringback tone server receives from a Service Control Point (SCP) a message instructing the ringback tone server which ringback tone to play, and wherein the identification information is stored at an account management component upon receipt of a bookmark request received by the ringback tone server, and wherein the ringback tone server establishes a bearer path with the calling party, and wherein a bookmark message is associated with the stored identification information of the ringback tone where the bookmark request is stored by the ringback tone server before a bearer path is established between the called party and the calling party; and
    wherein storing the identification information at an account management component further comprises determining whether to store the identification information in one of a service management system and a ringback tone interface, and if the ringback tone server stores the identification information in the service management system the ring back tone server communicates the identification information to the service management system via a real-time database, and if the ringback tone server stores the identification information in the ringback tone service interface, the ringback tone server communicates the identification information to the ringback tone interface using a text message.

2. The method of claim 1, wherein the bookmark request indicates that the calling party has an interest in the ringback tone and wants to be reminded of the ringback tone when the calling party accesses an account management component, the method further comprising the step of:
    presenting the identification information of the ringback tone to the calling party when the calling party accesses the account management system to remind the calling party of the ringback tone that was playing when the calling party made the bookmark request.

3. The method of claim 1, wherein the step of storing the identification information comprises the step of:
    storing for later presentation to the calling party the identification information of the ringback tone, an identification of the calling party, an identification of the called party, a date of the call, a time of the call, and an identification of the ringback tone server that played the ringback tone to the calling party.

4. The method of claim 1, wherein the ringback tone comprises a specialized ringback tone selected for use on the call by the called party, wherein the step of playing the ringback tone comprises the step of:
    playing the specialized ringback tone to the calling party during the ringing phase of the call from the calling party to the called party;
    wherein the bookmark request comprises a Dual-Tone Multi-Frequency ("DTMF") tone, a voice command, or a data message input by the calling party, and wherein the step of storing the identification information comprises the steps of:
    receiving the DTMF tone, the voice command, or the data message from the calling party during the ringing phase of the call; and collecting the identification information of the ringback tone in response to at least one of the DTMF tone, the voice command, and the data message from the calling party wherein the identification information is stored.

5. The method of claim 4, further comprising the step of: announcing to the calling party, before playing the ringback tone, that the calling party can input the DTMF tone, the voice command, or the data message to make the bookmark request.

6. The method of claim 1, wherein the step of storing the identification information comprises the step of:
associating the identification information of the ringback tone with a ringback tone service account of the calling party;
the method further comprising the step of:
presenting the identification information of the ringback tone to the calling party when the calling party fogs into the ringback tone service account.

7. The method of claim 6, further comprising the steps of:
providing one or more options related to the ringback tone to the calling party when the calling party logs into the ringback tone service account; and
reminding the calling party, when the calling party logs into the ringback tone service account, of ringtones that that have been previously kept by the calling party.

8. The method of claim 7, wherein the one or more options comprise one or more of: allowing the calling party to purchase the ringback tone for later use, allowing the calling party to sample the ringback tone, and allowing the calling party to query for additional information of the ringback tone.

9. The method of claim 6, wherein the ringback tone comprises a song, and wherein the step of presenting the identification information comprises the step of:
presenting to the calling party one or more of: a name of the song, a name of an artist of the song, and a name of an album that contains the song;
presenting to the calling party a location where the album that contains the song can be purchased; and
providing a sale or discount coupon for the album that contains the song, wherein the sale or discount coupon can be used at an album sales website or be printed out to take to a store to purchase the album.

10. The method of claim 1, further comprising the step of:
the ringback tone server providing control instruction to the calling party prior to the ringback tone server playing the ringback tone, wherein the control instructions indicate how a subscriber may bookmark a ringback tone;
the ringback tone server establishes a bearer path with an originating MSC and stores identification associated with the ringback tone before the ringback tone server releases the bearer path;
the bookmark request is initiated by the calling party before the called party answers the call.

11. The method of claim 1, further comprising the steps of:
offering the ringback tone to the calling party for later use by the calling party; and
updating a ringback tone subscriber profile of the calling party to add an indication of the ringback tone if the calling party decides to use the ringback tone.

12. The method of claim 11, wherein the calling party comprises a subscriber of a ringback tone service, and wherein the ringback tone subscriber profile is employable to determine which ringback tones to play on incoming calls to the subscriber; and
wherein the step of updating the ringback tone subscriber profile comprises the steps of:
creating one or more ringback tone selection criteria that indicate when to play the ringback tone associated with the bookmark request to other callers on the incoming calls to the subscriber; and
storing the one or more ringback tone selection criteria in the ringback tone subscriber profile.

13. The method of claim 1, further comprising the steps of:
examining the bookmark request database when the calling party logs into a ringback tone service account;
managing a plurality of bookmark messages when the calling party logs into a ringback tone service account by performing at least one of keeping and discarding a located bookmark message, wherein the managing a plurality of bookmark messages step further comprises the step of selecting, by the calling party, a bookmark message to be at least one of deleted and discarded from the plurality of bookmark messages and wherein the selected bookmark message was previously stored by the calling party during a call attempt;
encountering the indication of the bookmark request;
presenting the identification information of the ringback tone associated with the bookmark request to the calling party when the calling party accesses the account management component to remind the calling party of the ringback tone that was playing when the calling party made the bookmark request;
removing the indication of the bookmark request from the bookmark request database if the calling party indicates that a subsequent reminder of the ringback tone is not desired; and
keeping the indication of the bookmark request in the bookmark request database if the calling party indicates that a subsequent reminder of the ringback tone is desired.

14. The method of claim 1, wherein the step of storing the identification information comprises the step of:
sending the identification information of the ringback tone to an account management component that maintains a ringback tone service account for the calling party, wherein the account management component stores the identification information of the ringback tone in the ringback tone service account for later presentation to the calling party.

15. An apparatus, comprising:
a ringback tone server that plays a ringback tone to a calling party during a call and receives a bookmark request from the calling party, and wherein the ringback tone server resides in a Wireless Intelligent Network (WIN), and wherein the ringback tone server receives from a Service Control Point (SCP) a message instructing the ringback tone server which ringback tone to play; and
wherein the ringback tone server establishes a bearer path with an originating MSC; and
wherein upon receipt of the bookmark request, the ringback tone server communicates a text message to an account management component in the WIN, and wherein the text message comprises identification information of the ringback tone, and wherein a bookmark message is associated with the stored identification information of the ringback tone and the bookmark message is stored among a plurality of bookmark messages before releasing the bearer path with the originating MSC; and
wherein storing the identification information at an account management component further comprises determining whether to store the identification information in one of a service management system and a ringback tone interface, and if the ringback tone server stores the identification information in the service management system the ring back tone server communicates the identification information to the service management system via a real-time database, and if the ringback tone server stores the identification information in the ringback tone service interface, the ringback tone server communicates the identification information to the ringback tone interface using a text message.

16. The apparatus of claim 15, wherein the ringback tone server plays the ringback tone to the calling party during a ringing phase of a call from the calling party to a called party that selected the ringback tone for use on the call; and
   wherein the bookmark request comprises a DTMF tone, a voice command, or a data message input by the calling party, wherein the ringback tone server receives the DTMF tone, the voice command, or the data message during the ringing phase of the call; and
   wherein the bookmark request is stored before the bearer path is established between the called party and the calling party.

17. The apparatus of claim 15, wherein the bookmark request indicates that the calling party has an interest in the ringback tone and wants to be reminded of the ringback tone when the calling party accesses the account management component; and
   wherein the text message is communicated via an operations, administration, maintenance and provisioning (OAM&P) interface.

18. The apparatus of claim 15, wherein the ringback tone server plays the ringback tone to the calling party on a call from the calling party to a called party; and
   wherein upon receipt of the bookmark request on the call, the ringback tone server captures for storage:
   the identification information of the ringback tone;
   an identification of the calling party;
   an identification of the called party;
   a date of the call;
   a time of the call; and
   an identification of the ringback tone server.

19. The apparatus of claim 15 further comprising the account management component that maintains a ringback tone service account for the calling party;
   wherein the ringback tone server sends the identification information of the ringback tone to the account management component, and wherein the account management component associates the identification information of the ringback tone with the ringback tone service account of the calling party; and
   wherein a plurality of bookmark messages is managed by performing at least one of keeping and discarding a located bookmark message, and wherein the calling party manages the bookmark messages by selecting a bookmark message to be at least one of deleted and discarded from the plurality of bookmark messages, and wherein the selected bookmark message was previously stored by the calling party when attempting a call.

20. The apparatus of claim 19, wherein at a time after the calling party sent the bookmark request, the calling party logs into an account management component to access the ringback tone service account and the account management component presents the identification information of the ringback tone to the calling party.

21. The apparatus of claim 19, wherein at a time after the calling party sent the bookmark request, the calling party logs into the account management component to access the ringback tone service account and the account management component offers the ringback tone to the calling party for later use by the calling party; and
   wherein if the calling party decides to use the ringback tone, then a ringback tone subscriber profile of the ringback tone service account is updated to add an indication of the ringback tone; and
   the calling party is reminded of ringtones that have been previously kept by the calling party when the calling party logs into the ringback tone service account.

22. A ringback tone server configured to:
   play a ringback tone to a calling party on a call to a called party and receive a bookmark request from the calling party, wherein the ringback tone server resides in a Wireless Intelligent Network (WIN), and where the ringback tone server receives from a Service Control Point (SCP) a message instructing the ringback tone server which ringback tone to play;
   establish a bearer path with the calling party via an originating MSC;
   determine, upon receipt of the bookmark request, whether to store the identification information of the ringback tone in one of a service management system and a ringback tone service interface,
      a) wherein if the ringback tone server stores the identification information in the service management system the ring back tone server communicates the identification information to the service management system via a real-time database, and
      b) if the ringback tone server stores the identification information in the ringback tone service interface, the ringback tone server communicates the identification information to the ringback tone service interface via a text message; and
   communicate the identification information before the bearer path with the originating MSC is released and before a bearer path is established between the calling party and the called party.

* * * * *